US011768527B2

(12) United States Patent
Nguyen et al.

(10) Patent No.: US 11,768,527 B2
(45) Date of Patent: Sep. 26, 2023

(54) DATA CENTER COMPONENT REPLACEMENT

(71) Applicant: International Business Machines Corporation, Armonk, NY (US)

(72) Inventors: Tram Thi Mai Nguyen, Santa Clara, CA (US); Tamas Pinter, Budapest (HU); Damir Dervaric, Bled (SI); Brian D Herr, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 17/238,610

(22) Filed: Apr. 23, 2021

(65) Prior Publication Data

US 2022/0342460 A1 Oct. 27, 2022

(51) Int. Cl.
*G06F 11/00* (2006.01)
*G06F 1/18* (2006.01)
(Continued)

(52) U.S. Cl.
CPC .......... *G06F 1/182* (2013.01); *G06F 11/3006* (2013.01); *G06F 11/3062* (2013.01); *G06F 11/327* (2013.01)

(58) Field of Classification Search
CPC ............. G06F 11/3006; G06F 11/3062; G06F 11/327; G06F 11/0709; G06F 11/324;
(Continued)

(56) References Cited

U.S. PATENT DOCUMENTS 6,839,607 B2   1/2005  Wooten
6,975,241 B2  12/2005  Post et al.
(Continued)

FOREIGN PATENT DOCUMENTS

CN   104691449 A  *  6/2015  ........ B60R 16/0231
EP      1459183 A2      9/2004
KR  102155014 B1  *  1/2020

OTHER PUBLICATIONS

IBM, "Removing a disk drive or solid-state drive from the 8286-41A or 8286-42A with the power turned on in IBM i", last updated Jul. 26, 2019, 7 pages.
(Continued)

*Primary Examiner* — Katherine Lin
(74) *Attorney, Agent, or Firm* — Stosch Sabo

(57) ABSTRACT

Described is a system including a server rack comprising a plurality of components, a plurality of touch sensors respectively coupled with the plurality of components of the server rack, and a management system communicatively coupled to the server rack. The management system comprises one or more processors and one or more computer-readable storage media storing instructions, which, when executed by the one or more processors, are configured to cause the management system to perform a method. The method comprises receiving, from the server rack, an indication of a failed component of the plurality of components. The method further comprises receiving, from a first touch sensor of the plurality of touch sensors, a touch indication. The method further comprises transmitting, to the server rack, an indication of whether the first touch sensor is coupled to the failed component.

19 Claims, 5 Drawing Sheets

(51) Int. Cl.
*G06F 11/30* (2006.01)
*G06F 11/32* (2006.01)

(58) Field of Classification Search
CPC .. G06F 11/328; G06F 11/321; G06F 11/0751; G06F 11/0766; G06F 11/0769
See application file for complete search history.

(56) References Cited

U.S. PATENT DOCUMENTS

| | | |
|---|---|---|
| 7,106,169 B2 | 9/2006 | Ives et al. |
| 7,239,522 B2 | 7/2007 | Rust et al. |
| 7,359,186 B2 | 4/2008 | Honda et al. |
| 7,882,382 B2 | 2/2011 | Aksamit et al. |
| 8,042,123 B2 | 10/2011 | Terzis et al. |
| 8,630,918 B1 | 1/2014 | Krechel et al. |
| 2008/0158179 A1* | 7/2008 | Wilson ............ G06F 3/0446 345/173 |
| 2010/0123992 A1 | 5/2010 | Huang |
| 2013/0222288 A1* | 8/2013 | Lim ............ G06F 3/03547 345/173 |

OTHER PUBLICATIONS

IBM, "IT Infrastructure", printed Feb. 23, 2021, 5 pages <http://www.ibm.com/systems/storage/flash>.
Mell et al., "The NIST Definition of Cloud Computing", Recommendations of the National Institute of Standards and Technology, Sep. 2011, 7 pages.

* cited by examiner

DATA CENTER COMPONENT REPLACEMENT

BACKGROUND

The present disclosure relates to maintenance of computational systems, and, more specifically, to a touch-based part replacement feedback mechanism for reducing erroneous part replacements in computational systems.

Computational systems such as, for example, server racks in data centers, can experience component failures due to age, wear, malfunction, and/or other reasons. When a computational system experiences a component failure, the failed component needs to be replaced to restore functionality to the computational system. However, in a complex computational system such as a data center storing hundreds or thousands of server racks, the incorrect component can be replaced due to human error. Incorrect component replacement fails to remediate the original problem, and, in addition, creates additional problems (e.g., data loss, service disruption, etc.) by incorrectly reconfiguring and/or removing/replacing a working component.

SUMMARY

Aspects of the present disclosure are directed toward a system comprising: a server rack comprising a plurality of components, a plurality of touch sensors respectively coupled with the plurality of components of the server rack, and a management system communicatively coupled to the server rack. The management system can comprise one or more processors and one or more computer-readable storage media storing instructions, which, when executed by the one or more processors, are configured to cause the management system to perform a method. The method comprises receiving, from the server rack, an indication of a failed component of the plurality of components, receiving, from a first touch sensor of the plurality of touch sensors, a touch indication, and transmitting, to the server rack, an indication of whether the first touch sensor is coupled to the failed component.

Further aspects of the present disclosure are directed toward a computer-implemented method for a touch-based alarm mechanism to reduce incorrect part replacement in a data center. The computer-implemented method comprises identifying a failed hardware subsystem in the data center. The method further comprises, in response to receiving a first touch stimulus on a first touch sensor of a functioning hardware subsystem, issuing a first type of alert indicating that a technician is touching an incorrect part for replacement. The method further comprises, in response to receiving a second touch stimulus on a second touch sensor of the failed hardware subsystem, issuing a second type of alert indicating that the technician is touching the failed hardware subsystem.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
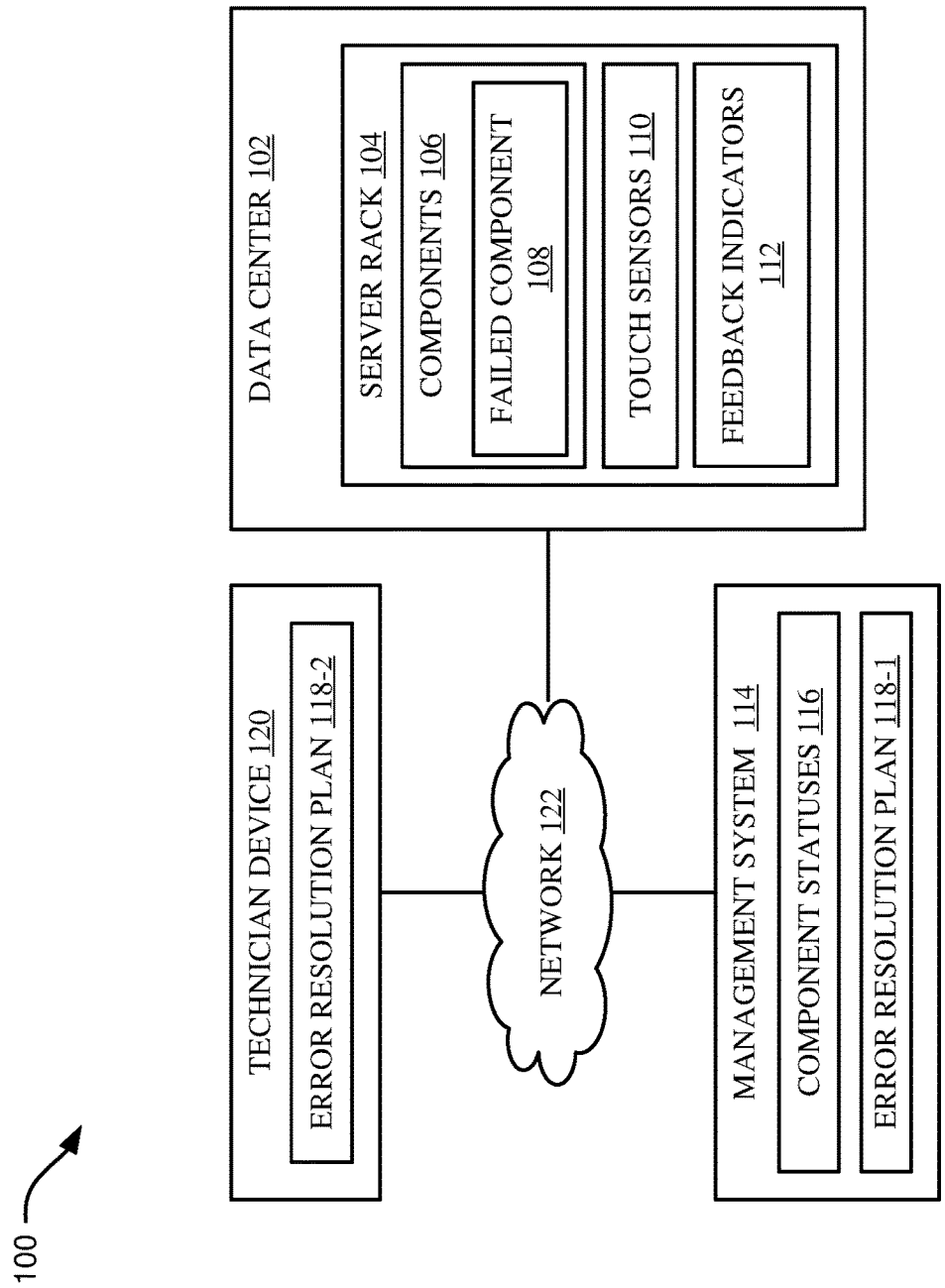
FIG. 1 illustrates a block diagram of an example computational environment implementing a touch-based part replacement protocol, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward maintenance of computational systems, and, more specifically, to a touch-based part replacement feedback mechanism for reducing erroneous part replacements in computational systems. While not limited to such applications, embodiments of the present disclosure may be better understood in light of the aforementioned context.

Aspects of the present disclosure provide a secondary mechanism by which a technician can confirm that the technician has identified a correct part for replacement or repair in a data center through the use of touch sensors. In some embodiments, a technician touches a touch sensor coupled to a component that the technician believes to be a failed component. In response to touching the touch sensor, the technician receives an indication of whether the touched component is or is not the failed component. The indication can be visual and/or audible. The indication can be provided by the component itself, an associated server rack, or a technician's device (e.g., tablet, smartphone, laptop, etc.).

Advantageously, aspects of the present disclosure reduce incorrect replacements and/or repairs of components in computational systems. As is understood by one skilled in the art, errors occur when technicians are faced with row upon row of essentially identical server racks in a data center or other computational system. These errors can cause technicians to inadvertently replace or repair an incorrect component. Incorrect replacements/repairs can lead to data loss, service disruption, and other problems by disconnecting, erasing, or reconfiguring a component that is, in fact, functioning properly. To remedy this, aspects of the present disclosure couple touch sensors to components in a system, and the touch sensors can be configured to physically (e.g., in the data center) and unambiguously confirm whether or not a technician has correctly identified a component for replacement or repair. Accordingly, aspects of the present disclosure reduce erroneously replaced/repaired components in computational systems, thereby realizing improvements to the computational system such as reduced downtime, increased performance, increased availability, increased capacity, increased efficiency, lower cost, and/or other improvements.

FIG. 1 illustrates a block diagram of an example computational environment 100 implementing a touch-based part replacement protocol, in accordance with some embodiments of the present disclosure. The computational environment 100 includes a data center 102 communicatively coupled to a management system 114 and a technician device 120 via a network 122. Network 122 can be a permanent, semi-permanent, or intermittent network that continuously or intermittently connects two or more of the data center 102, the management system 114, and/or the technician device 120. The network 122 can be a wide area network (WAN), local area network (LAN), personal area network (PAN), or another type of network. In some embodiments, the network 122 is the Internet or an intranet.

The data center 102 can be any computational system comprising hardware modules such as, but not limited to, a data center storing a plurality (e.g., tens, hundreds, or thousands) of server racks, an enterprise data storage and computing system, or any other computational system made up of a plurality of replaceable hardware modules (e.g., electronic components such as memory hardware, processing hardware, networking hardware, climate control hardware, and the like).

As one example, data center 102 can include a server rack 104. Server rack 104 can comprise a structure capable of securely holding multiple components 106 (e.g., pieces of computational equipment for networking, computing, storage, and/or climate control purposes) in one area. The server rack 104 can be configured to hold components 106 such as, but not limited to, routers, network switches, hubs, servers, processor, networking cards, memory modules, climate control modules (e.g., fans, heat sinks, etc.), and the like. The components 106 can include a failed component 108 that needs to be replaced.

In some embodiments, respective components 106 are coupled to respective touch sensors 110. Touch sensors 110 can be capacitive touch sensors, resistive touch sensors, or another type of touch sensor now known or later developed.

Capacitive touch sensors are triggered by the touch of a conductive material, such as a human finger, on a sensor electrode, where the touch increases an output capacitance detected by a measurement circuit periodically measuring capacitance of the capacitive touch sensor. In embodiments where the touch sensors 110 are capacitive touch sensors, the capacitive touch sensors can be surface capacitive sensing or projected capacitive sensing. Capacitive touch sensors generally have a shorter response time compared to resistive touch sensors.

Resistive touch sensors are simple control circuits that are not based on the electrical property of capacitance. Rather, resistive touch sensors detect pressure on a surface. Accordingly, resistive touch sensors can function with non-conducting materials (e.g., a stylus, a gloved hand, etc.). With resistive touch sensors, a voltage between conductive layers is measured. A touch can cause the two conductive layers to contact one another and cause a voltage drop which signals a touch. In embodiments where the touch sensors 110 are resistive touch sensors, the resistive touch sensors can be 4-wire, 5-wire, or 8-wire resistive touch sensors. In some embodiments, 4-wire resistive touch sensors are relatively lower-cost compared to other resistive touch sensors, 5-wire resistive touch sensors are relatively more durable compared to other resistive touch sensors, and 8-wire resistive touch sensors are relatively more accurate compared to other resistive touch sensors.

Touch sensors 110 can be incorporated into the components 106 or, alternatively, incorporated into the server rack 104. When incorporated into the server rack 104, the touch sensors 110 can, for example, be incorporated into, or otherwise attached to, fasteners, latches, restraints, or other receptacles for securing each component 106 to the server rack 104. In some embodiments, touch sensors 110 are of unitary construction with the components 106 or the server rack 104 (e.g., incorporated into one another at fabrication or post-processing of the server rack 104 and/or components 106). In other embodiments, the touch sensors 110 are retrofitted to the server rack 104 or components 106. When the touch sensors 110 are retrofitted to the server rack 104 or components 106, the touch sensors 110 can be applied by adhesive bonding, mechanical fastening, mechanical interlocking, or another mechanism for securing the touch sensors 110 to the server rack 104 or components 106.

In some embodiments, server rack 104 also includes feedback indicators 112. Feedback indicators 112 can be respectively associated with the server rack 104 or the components 106. The feedback indicators 112 provide feedback such as an indication of whether a component 106 or server rack 104 that a technician has touched (via the touch sensor 110) is the failed component 108 or another, functioning component of components 106. The feedback indicators 112 can provide audible feedback, visual feedback, a different kind of feedback, or a combination of any of the aforementioned feedback. The feedback indicators 112 can be, for example, a speaker capable of emitting various sounds, a light capable of turning on or off, a light capable of displaying different colors (e.g., green, red, yellow, etc.), a panel of lights capable of displaying various meaningful patterns comprised of on/off and/or colors of the panel of lights, and/or another device capable of providing audible and/or visual feedback.

Touch sensors 110 and feedback indicators 112 can also include, or be communicatively coupled to, wireless or wired communication functionality such as, for example, a networking card. The wireless or wired communication functionality can enable signals detected by the touch sensors 110 (e.g., a touch) to be electronically transmitted to other components of the computational environment 100 (e.g., server rack 104, data center 102, management system 114, and/or technician device 120). Similarly, the wireless or wired communication functionality can enable instructions for emitting various indications confirming whether or not a touched component is the failed component 108 to be transmitted to, received by, and implemented by, the feedback indicators 112.

Management system 114 can manage the data center 102. For example, management system 114 can monitor component statuses 116 of components 106 in server rack 104 for maintenance, efficiency, or other purposes. Component statuses 116 can comprise a database relating components 106 to associated touch sensors 110 and including a status of each of the components 106. The component statuses 116 can be based on data received from the components 106, data received from the server rack 104, and/or data inferred from communications between management system 114 and components 106. For example, component statuses 116 may include an indication that failed component 108 is failed based on a message (e.g., status update, error message, etc.) sent from failed component 108 to the management system 114. Alternatively, or additionally, component statuses 116 can infer that failed component 108 is failed based on unsuccessful connection attempts to the failed component 108.

In response to identifying failed component 108 according to component statuses 116, the management system 114 can generate an error resolution plan 118-1. The error resolution plan 118-1 can include diagnostic and/or corrective information for repairing or replacing failed component 108. The error resolution plan 118-1 can include information useful for identifying the failed component 108 such as, but not limited to, type of failed component 108 (e.g., server, memory module, processing module, router, hub, climate control device, etc.), a location of the failed component 108, a serial number of the failed component 108, a serial number of the server rack 104 housing the failed component 108, and/or other identifying information.

In some embodiments, the error resolution plan 118-1 can be transmitted to the technician device 120 via the network 122. The technician device 120 can receive and store the error resolution plan 118-2. The technician device 120 can be any user device such as, but not limited to, a tablet, a smartphone, a laptop, or another computational device capable of electronically receiving and displaying information. A technician associated with the technician device 120 can consult the error resolution plan 118-2 while replacing or repairing the failed component 108.

When the technician enters the data center 102 to replace or repair the failed component 108, the technician can first touch a touch sensor 110 associated with one of the components 106 that the technician believes to be the failed component 108. The touch sensor 110 can transmit an indication of the sensed touch to the management system 114. The management system 114 can determine whether the touched touch sensor 110 is coupled to the failed component 108 based on the component statuses 116 and/or the error resolution plan 118-1. The management system 114 can then transmit an instruction to the feedback indicators 112 associated with the touched component to indicate whether the touched component is the failed component 108 or another one of the (working) components 106.

For example, if the touched component is the failed component 108, the management system 114 can cause the feedback indicators 112 to provide an indication that the touched component is the failed component 108 such as a first type of audible tone or a green light. Such an indication can provide confirmation to the technician that the technician has identified the correct part for replacement or repair. In contrast, if the touched component is not the failed component, the management system 114 can cause the feedback indicators 112 to provide an indication that the touched component is not the failed component 108 such as a second type of audible tone or a flashing red light. Such an indication can provide confirmation to the technician that the technician has identified an incorrect part for replacement and should review the error resolution plan 118-2 to identify the correct part for replacement.

In some embodiments, the indications of a correct or incorrect touched part are relayed to the technician device 120 rather than the feedback indicators 112 of the server rack 104. For example, a touched touch sensor 110 can send an indication to the management system 114, and the management system 114 can relay a correct or incorrect indication to the technician device 120. In still another embodiment, the technician device 120 can communicate directly with the data center 102 and a touched touch sensor 110 can send an indication to the technician device 120 where the technician device can compare the touched touch sensor 110 to the failed component 108 identified in the error resolution plan 118-2. If there is a match, then the technician device 120 can present an indication that the technician has correctly identified the failed component 108. If there is no match, the technician device 120 can present an indication that the technician has incorrectly identified the failed component 108.

The components of computational environment 100 are shown for illustrative purposes and the type of components, configuration of components, and number of components is not to be construed as limiting. For example, although a data center 102 is shown, aspects of the present disclosure are applicable to any computational system comprised for numerous components such as, for example, an enterprise network consisting of hubs, routers, repeaters, and endpoint devices. As another example, aspects of the present disclosure are applicable to an automated manufacturing line comprised of machines, conveyors, sensors, and the like.

Furthermore, it should be understood that components shown, if they exist at all, may be integrated within one another in various configurations. For example, in some embodiments, management system 114 can be integrated into data center 102. As another example, management system 114 can be a hypervisor managing virtual computational resources using underlying hardware computational resources in, for example, data center 102.

Figure 2:
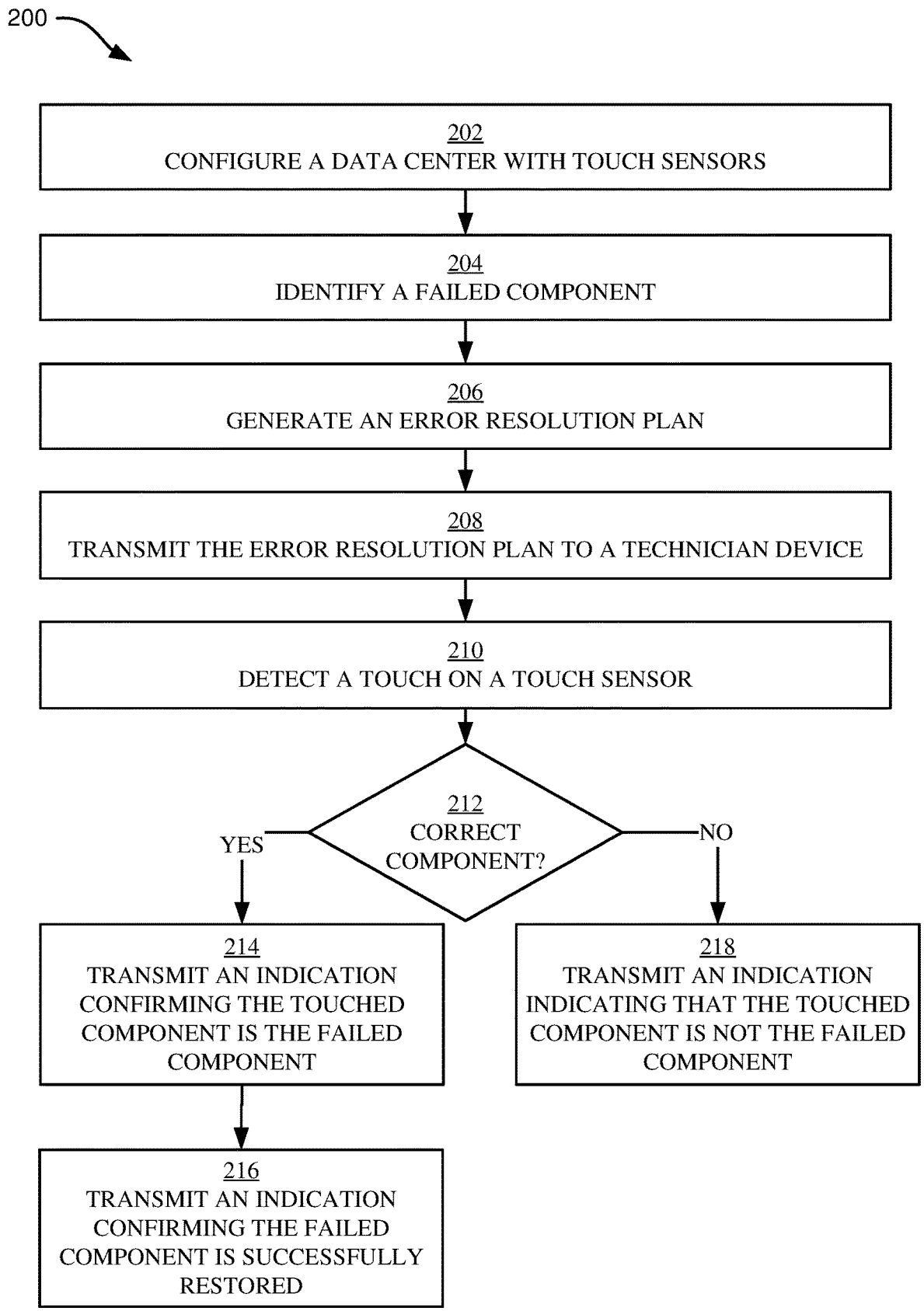
FIG. 2 illustrates a flowchart of an example method for implementing a touch-based part replacement protocol, in accordance with some embodiments of the present disclosure.

Referring now to FIG. 2, FIG. 2 illustrates a flowchart of an example method for implementing a touch-based part replacement protocol, in accordance with some embodiments of the present disclosure. In some embodiments, the method 200 is implemented by a server, a computer, a processor, a virtual machine, the management system 114 of FIG. 1, the technician device 120 of FIG. 1, the server rack 104 of FIG. 1, or another configuration of hardware and/or software.

Operation 202 includes configuring a data center 102 with touch sensors 110. Touch sensors 110 can be respectively coupled to components 106 (or server rack 104) in a data center 102. In some embodiments, the touch sensors 110 are of unitary construction with the components 106 (or server rack 104), while in other embodiments, the touch sensors 110 are retrofitted to the components 106 (or server rack 104).

Operation 204 includes identifying a failed component 108. The failed component 108 can be any failed hardware subsystem. The failed component 108 can be identified by, for example, a data base of component statuses 116 stored in a management system 114.

Operation 206 includes generating an error resolution plan 118-1. The error resolution plan 118-1 can identify the failed component 108. In some embodiments, the error resolution plan 118-1 provides step by step procedures for replacing or repairing the failed component 108.

Operation 208 includes transmitting the error resolution plan 118-1 to a technician device 120. The technician device 120 can receive the data and store it as error resolution plan 118-2.

Operation 210 includes detecting a touch on a touch sensor 110. Operation 212 includes determining if the component 106 corresponding to the touched touch sensor 110 is the failed component 108 or another component. If the touched touch sensor 110 corresponds to the failed component 108 (212: YES), then the method 200 proceeds to operation 214 and transmits an indication confirming the touched touch sensor 110 corresponds to the failed component 108 and that the technician has identified the appropriate component for repair or replacement. As previously discussed, the indication can be audible and/or visual. The indication can be transmitted to the sever rack 104 housing the failed component 108, the failed component 108, or the technician device 120.

In some embodiments, the method 200 then proceeds to operation 216 and transmits a indication confirming the failed component is successfully restored in response to detecting a touch on the touch sensor 110 after the technician has reconfigured, replaced, or otherwise restored functionality to the failed component 108. The indication transmitted in operation 216 can indicate that the failed component 108 is successfully working based on a resolution of an error message generated by the failed component 108, a successful connection request between the management system 114 and the failed component 108, or another indication that the failed component 108 is restored to functionality.

If the touched touch sensor 110 does not correspond to the failed component 108 (212: NO), then the method 200 proceeds to operation 218 and transmits an indication that indicates the touched touch sensor 110 does not correspond to the failed component 108 and that the technician has not correctly identified the appropriate component for repair or replacement. As previously discussed, the indication can be audible and/or visual. The indication can be transmitted to the sever rack 104 housing the component corresponding to the touched touch sensor 110, the component corresponding to the touched touch sensor 110, or the technician device 120.

Figure 3:
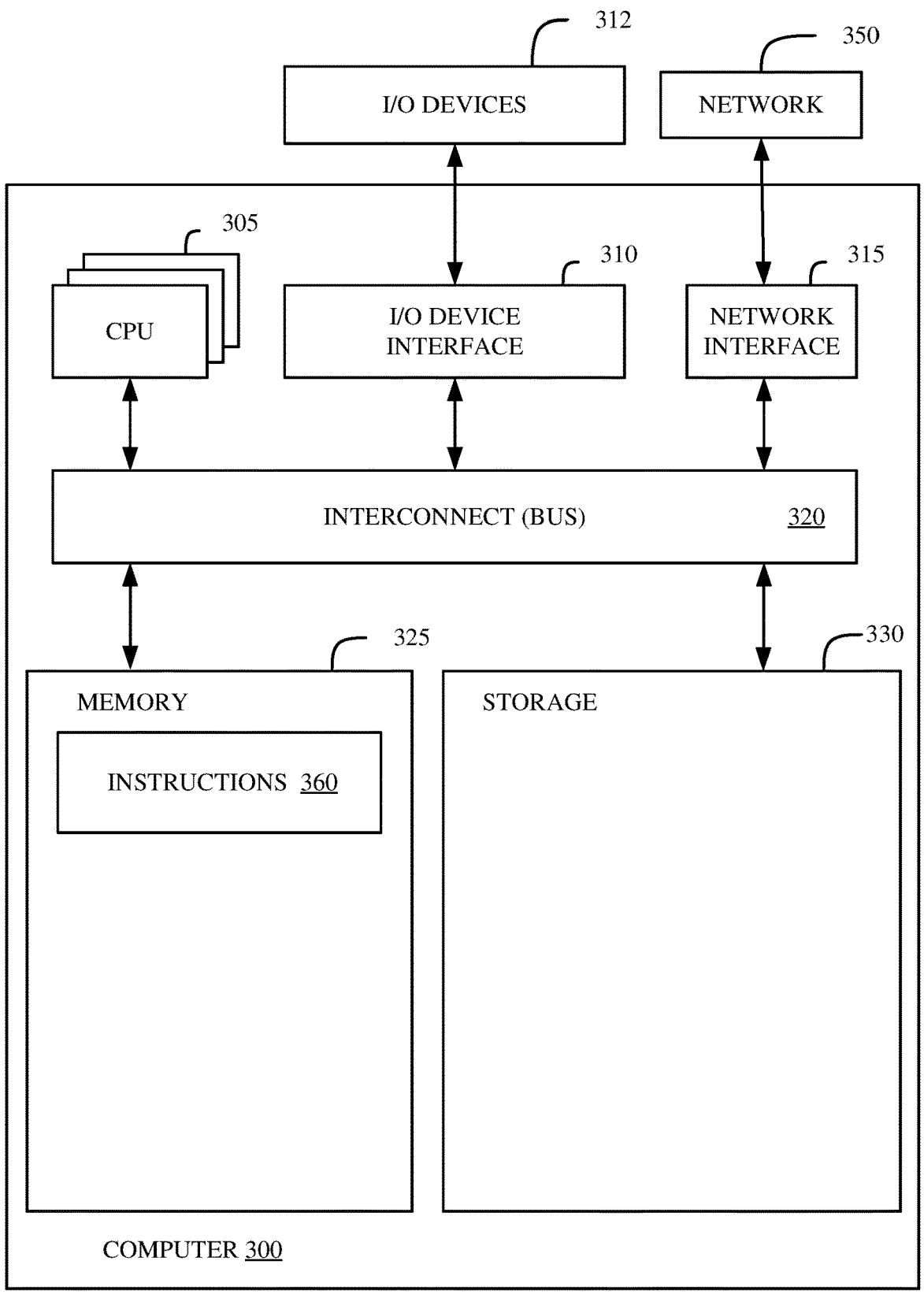
FIG. 3 illustrates a block diagram of an example computer, in accordance with some embodiments of the present disclosure.

FIG. 3 illustrates a block diagram of an example computer 300 in accordance with some embodiments of the present disclosure. In various embodiments, computer 300 can perform any or all portions of the method described in FIG. 2 and/or implement the functionality discussed in FIG. 1. In some embodiments, computer 300 receives instructions related to the aforementioned methods and functionalities by downloading processor-executable instructions from a remote data processing system via network 350. In other embodiments, computer 300 provides instructions for the aforementioned methods and/or functionalities to a client machine such that the client machine executes the method, or a portion of the method, based on the instructions provided by computer 300. In some embodiments, the computer 300 is incorporated into (or functionality similar to computer 300 is virtually provisioned to) one or more entities of the computational environment 100 of FIG. 1 (e.g., management system 114, technician device 120, data center 102, etc.) and/or other aspects of the present disclosure.

Computer 300 includes memory 325, storage 330, interconnect 320 (e.g., a bus), one or more CPUs 305 (also referred to as processors herein), I/O device interface 310, I/O devices 312, and network interface 315.

Each CPU 305 retrieves and executes programming instructions stored in memory 325 or storage 330. Interconnect 320 is used to move data, such as programming instructions, between the CPUs 305, I/O device interface 310, storage 330, network interface 315, and memory 325. Interconnect 320 can be implemented using one or more buses. CPUs 305 can be a single CPU, multiple CPUs, or a single CPU having multiple processing cores in various embodiments. In some embodiments, CPU 305 can be a digital signal processor (DSP). In some embodiments, CPU 305 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 325 is generally included to be representative of a random-access memory (e.g., static random-access memory (SRAM), dynamic random-access memory (DRAM), or Flash). Storage 330 is generally included to be representative of a non-volatile memory, such as a hard disk drive, solid state device (SSD), removable memory cards, optical storage, or flash memory devices. In an alternative embodiment, storage 330 can be replaced by storage area-network (SAN) devices, the cloud, or other devices connected to computer 300 via I/O device interface 310 or network 350 via network interface 315.

In some embodiments, memory 325 stores instructions 360. However, in various embodiments, instructions 360 are stored partially in memory 325 and partially in storage 330, or they are stored entirely in memory 325 or entirely in storage 330, or they are accessed over network 350 via network interface 315.

Instructions 360 can be computer-readable and computer-executable instructions for performing any portion of, or all of, the method of FIG. 2 and/or implementing the functionality discussed in any portion of FIG. 1. Although instructions 360 are shown in memory 325, instructions 360 can include program instructions collectively stored across numerous computer-readable storage media and executable by one or more CPUs 305.

In various embodiments, I/O devices 312 include an interface capable of presenting information and receiving input. For example, I/O devices 312 can present information to a user interacting with computer 300 and receive input from the user.

Computer 300 is connected to network 350 via network interface 315. Network 350 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
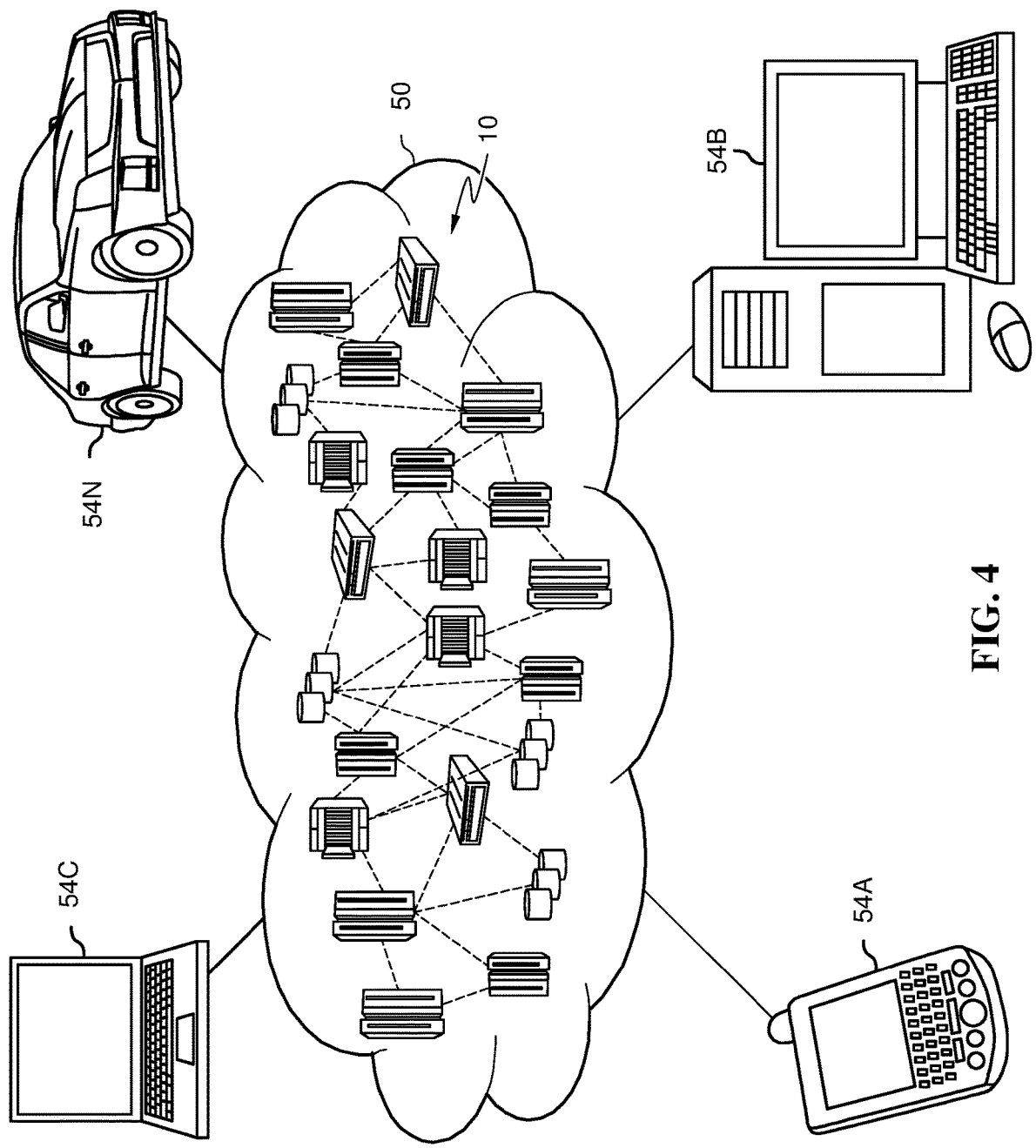
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
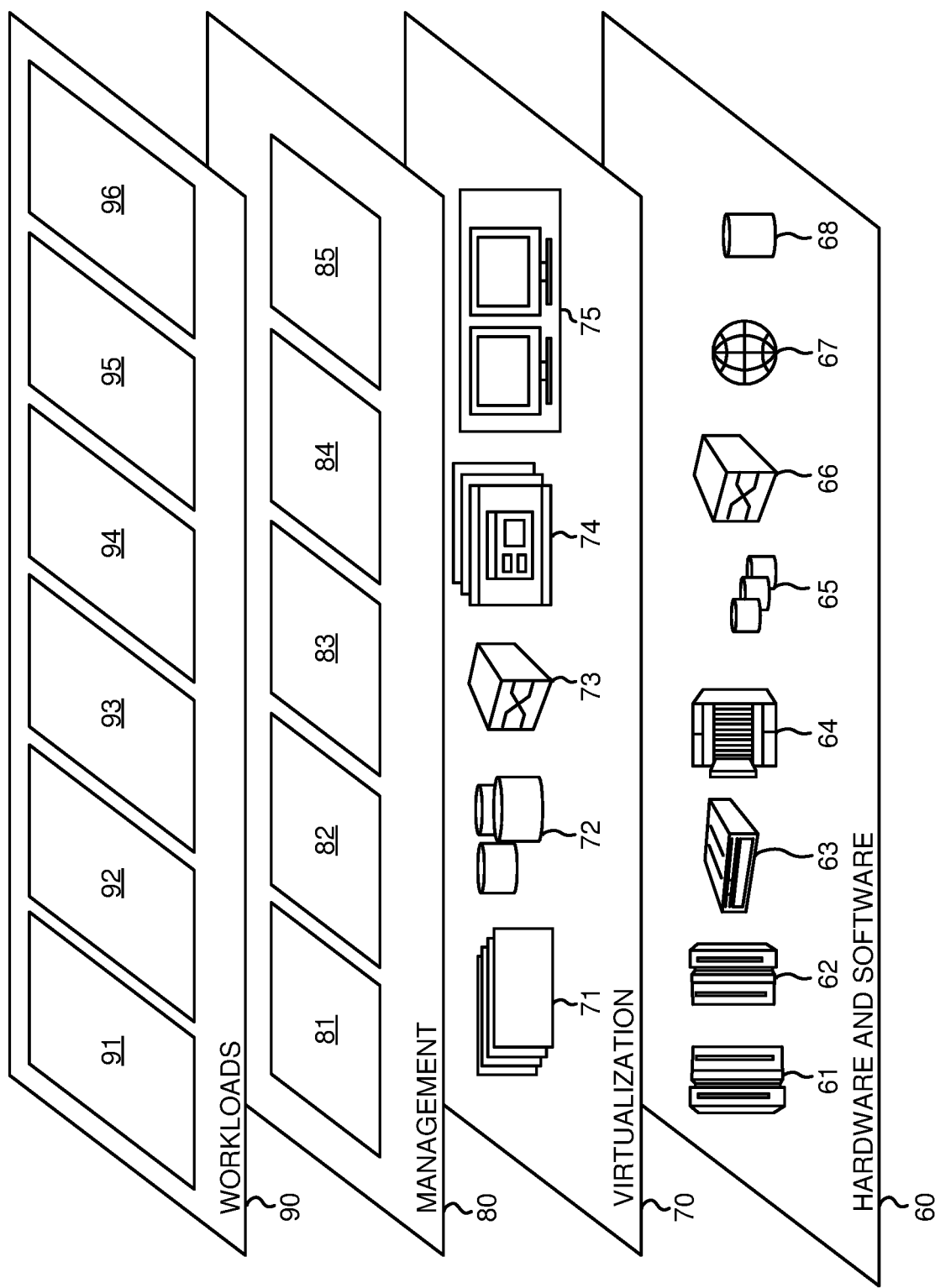
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a touch-based part replacement protocol 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 360 of FIG. 3 and/or any software configured to perform any portion of the method described with respect to FIG. 2 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a system. The system includes a server rack comprising a plurality of components; a plurality of touch sensors respectively coupled with the plurality of components of the server rack; and a management system communicatively coupled to the server rack, the management system comprising one or more processors and one or more computer-readable storage media storing instructions, which, when executed by the one or more processors, are configured to cause the management system to perform a method comprising: receiving, from the server rack, an indication of a failed component of the plurality of components; receiving, from a first touch sensor of the plurality of touch sensors, a touch indication; and transmitting, to the server rack, an indication of whether the first touch sensor is coupled to the failed component.

Example 2 includes the system of example 1, including or excluding optional features. In this example, the indication of the failed component comprises a non-functional status of the failed component stored in the management system.

Example 3 includes the system of any one of examples 1 to 2, including or excluding optional features. In this example, the indication of the failed component comprises a failed connection attempt to the failed component from the management system.

Example 4 includes the system of any one of examples 1 to 3, including or excluding optional features. In this example, the indication of whether the first touch sensor is coupled to the failed component is selected from a group consisting of: an audible indication, and a visual indication.

Example 5 includes the system of any one of examples 1 to 4, including or excluding optional features. In this example, the failed component is selected from a group consisting of: a processor, a networking card, a memory module, and a climate control module.

Example 6 includes the system of any one of examples 1 to 5, including or excluding optional features. In this example, the plurality of touch sensors comprises capacitive touch sensors.

Example 7 includes the system of any one of examples 1 to 6, including or excluding optional features. In this example, the plurality of touch sensors comprises resistive touch sensors.

Example 8 is a computer-implemented method for a touch-based alarm mechanism to reduce incorrect part replacement in a data center. The method includes identifying a failed hardware subsystem in the data center; in response to receiving a first touch stimulus on a first touch sensor of a functioning hardware subsystem, issuing a first type of alert indicating that a technician is touching an incorrect part for replacement; and in response to receiving a second touch stimulus on a second touch sensor of the failed hardware subsystem, issuing a second type of alert indicating that the technician is touching the failed hardware subsystem.

Example 9 includes the method of example 8, including or excluding optional features. In this example, identifying the failed hardware subsystem is based a non-functional status of the failed hardware subsystem stored in a management system of the data center.

Example 10 includes the method of any one of examples 8 to 9, including or excluding optional features. In this example, identifying the failed hardware subsystem is based on a failed connection attempt to the failed hardware subsystem from a management system of the data center.

Example 11 includes the method of any one of examples 8 to 10, including or excluding optional features. In this example, the first type of alert and the second type of alert are selected from a group consisting of: an audible alert, and a visual alert.

Example 12 includes the method of any one of examples 8 to 11, including or excluding optional features. In this example, the failed hardware subsystem comprises a component of a server rack.

Example 13 includes the method of any one of examples 8 to 12, including or excluding optional features. In this example, the failed hardware subsystem is selected from a group consisting of: a processor, a networking card, a memory module, and a climate control module.

Example 14 includes the method of any one of examples 8 to 13, including or excluding optional features. In this example, the method includes in response to identifying the failed hardware subsystem, generating a part replacement plan; and transmitting the part replacement plan to a user device associated with the technician.

Example 15 includes the method of any one of examples 8 to 14, including or excluding optional features. In this example, the first touch sensor and the second touch sensor comprise capacitive touch sensors.

Example 16 includes the method of any one of examples 8 to 15, including or excluding optional features. In this example, the first touch sensor and the second touch sensor comprise resistive touch sensors.

Example 17 includes the method of any one of examples 8 to 16, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 18 includes the method of any of examples 8 to 17, further comprising: in response to receiving a third touch stimulus on the second touch sensor after replacing the failed hardware subsystem, issuing a third type of alert indicating that the technician has successfully restored the failed hardware subsystem.

Example 19 is a system. The system includes one or more processors and one or more computer-readable storage media storing program instructions which, when executed by the one or more processors, are configured to cause the one or more processors to perform a method according to any one of examples 8 to 18.

Example 20 is a computer program product. The computer program product includes one or more computer readable storage media, and program instructions collectively stored on the one or more computer readable storage media, the program instructions comprising instructions configured to cause one or more processors to perform a method according to any one of examples 8 to 18.

What is claimed is:

1. A system comprising:
a server rack comprising a plurality of components;
a plurality of touch sensors respectively coupled with the plurality of components of the server rack; and
a management system communicatively coupled to the server rack, the management system comprising one or more processors and one or more computer-readable storage media storing instructions, which, when executed by the one or more processors, are configured to cause the management system to perform a method comprising:
receiving, from the server rack, an indication of a failed component of the plurality of components;
receiving, from a first touch sensor of the plurality of touch sensors, a touch indication; and
transmitting, to the server rack, an audible indication and/or a visual indication of whether the first touch sensor is coupled to the failed component.

2. The system of claim 1, wherein the indication of the failed component comprises a non-functional status of the failed component stored in the management system.

3. The system of claim 1, wherein the indication of the failed component comprises a failed connection attempt to the failed component from the management system.

4. The system of claim 1, wherein the failed component is selected from a group consisting of: a processor, a networking card, a memory module, and a climate control module.

5. The system of claim 1, wherein the plurality of touch sensors comprises capacitive touch sensors.

6. The system of claim 1, wherein the plurality of touch sensors comprises resistive touch sensors.

7. A computer-implemented method comprising:
identifying a failed hardware subsystem in a data center;
in response to receiving a first touch stimulus on a first touch sensor of a functioning hardware subsystem, issuing a first type of alert indicating that a technician is touching an incorrect part for replacement;
in response to receiving a second touch stimulus on a second touch sensor of the failed hardware subsystem, issuing a second type of alert indicating that the technician is touching the failed hardware subsystem; and
in response to receiving a third touch stimulus on the second touch sensor after replacing the failed hardware subsystem, issuing a third type of alert indicating that the technician has successfully restored the failed hardware subsystem.

8. The method of claim 7, wherein identifying the failed hardware subsystem is based on a non-functional status of the failed hardware subsystem stored in a management system of the data center.

9. The method of claim 7, wherein identifying the failed hardware subsystem is based on a failed connection attempt to the failed hardware subsystem from a management system of the data center.

10. The method of claim 7, wherein the first type of alert and the second type of alert are selected from a group consisting of: an audible alert, and a visual alert.

11. The method of claim 7, wherein the failed hardware subsystem comprises a component of a server rack.

12. The method of claim 7, wherein the failed hardware subsystem is selected from a group consisting of: a processor, a networking card, a memory module, and a climate control module.

13. The method of claim 7, wherein the first touch sensor and the second touch sensor comprise capacitive touch sensors.

14. The method of claim 7, wherein the first touch sensor and the second touch sensor comprise resistive touch sensors.

15. The method of claim 7, wherein the method is performed by one or more computers according to software that is downloaded to the one or more computers from a remote data processing system.

16. The method of claim 15, wherein the method further comprises:
    metering a usage of the software; and
    generating an invoice based on metering the usage.

17. A computer-implemented method comprising:
    identifying a failed hardware subsystem in a data center;
    in response to receiving a first touch stimulus on a first touch sensor of a functioning hardware subsystem, issuing a first type of alert indicating that a technician is touching an incorrect part for replacement;
    in response to receiving a second touch stimulus on a second touch sensor of the failed hardware subsystem, issuing a second type of alert indicating that the technician is touching the failed hardware subsystem;
    generating a part replacement plan based on the failed hardware subsystem; and transmitting the part replacement plan to a user device to execute the plan.

18. The method of claim 17, wherein the first type of alert and the second type of alert are selected from a group consisting of: an audible alert, and a visual alert.

19. The method of claim 17, wherein the first touch sensor and the second touch sensor are selected from a group consisting of: capacitive touch sensors, and resistive touch sensors.

* * * * *